United States Patent
Aloia

[11] 3,951,927
[45] Apr. 20, 1976

[54] VULCANIZABLE ELASTOMERS FROM POLYTHIODIETHANOL

[75] Inventor: Romeo Raymond Aloia, Somerville, N.J.

[73] Assignee: American Cyanamid Company, Stamford, Conn.

[22] Filed: Sept. 18, 1974

[21] Appl. No.: 507,031

[52] U.S. Cl. .................................................. 260/79
[51] Int. Cl.² ....................................... C08G 75/12
[58] Field of Search ...................................... 260/79

[56] References Cited
OTHER PUBLICATIONS
Andrews et al., Journal of Polymer Science Vol. XLI, pp. 231–239 (1959).

*Primary Examiner*—V. P. Hoke
*Attorney, Agent, or Firm*—Charles J. Fickey

[57] ABSTRACT

A vulcanizable elastomer composition is provided comprising a copolymer represented by the formula:

H——$_n$ OH wherein

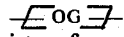

consists of randomly alternating structural units (I) and (II)

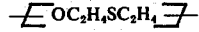

(I)

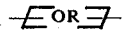

(II)

wherein R is one or more radicals which are the residues remaining on removal of two aliphatic hydroxyl groups of diols selected from (a) saturated linear, branched chain or cyclic diols and (b) linear, branched chain or cyclic diols containing external unsaturation having an allylic hydrogen atom; being characterized in that n is an integer sufficient to provide a molecular weight at least about 8000; the molar ratio of structural units (I) to structural units (II) being not less than 1:1; and containing from about 1 to 10 mole percent of the total of (I) and (II) of said linear, branched chain or cyclic diol containing external unsaturation.

8 Claims, No Drawings

VULCANIZABLE ELASTOMERS FROM POLYTHIODIETHANOL

Generally stated, the subject matter of the present invention relates to novel vulcanizable elastomeric compositions, to elastomers obtained therefrom and to a method for their preparation. More particularly, the invention relates to elastomers based on copolymers of thiodiethanol with aliphatic diols which exhibit excellent low temperature flexibility, as well as outstanding resistance to hydrocarbon oils.

BACKGROUND OF THE INVENTION

Thiodiethanol is a well known diol, the hydroxyl groups of which exhibit unusual reactivity because of their positioning beta to a sulfur atom in an aliphatic chain. Unlike alkanediols, such as 1,4-butanediol, thiodiethanol quite readily undergoes an autocondensation reaction under the influence of heat and certain acidic dehydrating catalysts, such as hydrogen chloride. This was shown by Ballard et al, U.S. Pat. No. 2,484,369. Low molecular weight, rubberlike materials, indicated as (I) in the following reaction scheme, were obtained:

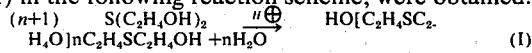
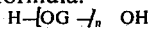

Woodward et al, J. Poly. Sci. 41, 219–23; 225–30 and 231–239 (1959), studied the acid-catalyzed autocondensation of thiodiethanol with hydrochloric acid and phosphorus pentoxide, and copolymerization thereof with aliphatic hydroxy compounds. Hydrochloric acid provided low molecular weight, waxy, water-soluble polymers in addition to ring closure to thioxane. Phosphorus pentoxide afforded products ranging from viscous liquids to rubbery waxes. Some indication of copolymerization with diethylene, trimethylene and butylene glycols were found. However, no useful rubbery polymers were observed.

Thiodiethanol has been copolymerized with equimolar amounts of 1,6-hexanediol in the presence of p-toluene sulfonic acid to give low molecular weight waxy polymers (Holtschmidt, U.S. Pat. No. 2,998,413); with triethylene glycol, 1,6-hexanediol and trimethylol propane in the presence of phosphorous acid to give low molecular weight polymers useful as polyurethane intermediates (Holtschmidt, French Patent No. 1,373,471); with thiodipropionic acid to give hydroxyl terminated low molecular weight polymers suitable for polyurethanes (Holtschmidt, German Patent No. 1,045,641). These products have been reacted with aromatic diisocyanates to provide polyurethane elastomers; see, for example, U.S. Pat. No. 2,862,962; French Patent No. 1,373,471; German Patent Nos. 1,007,502, 1,045,641 and 1,108,903 and British Patent Nos. 791,854 and 818,359.

However, neither the autocondensation of thiodiethanol, nor co-condensation with aliphatic diols, has resulted in rubbery products which were useful. Moreover, elastomers derived from thiodiethanol, other than the polyurethane elastomers described above, have not been disclosed.

The present invention represents the culmination of a long series of investigations, conducted largely by the inventor, directed to preparing vulcanizable elastomers based on copolymers of thiodiethanol.

Accordingly, it is an object of this invention to provide vulcanizable elastomer compositions based on copolymers of thiodiethanol.

An additional object is to provide useful elastomers from such compositions.

A further object of the invention is to provide elastomers which have low temperature flexibility and resistance to hydrocarbon oils.

It is yet another object of the invention to provide a method for preparing said elastomers.

Additional objects and advantages will be set forth in part in the description which follows and in part will be obvious from the description or may be learned by the practice of the invention, the object and advantages being realized and attained by means of the compositions, processes and improvements, particularly pointed out in the appended claims.

THE INVENTION

To achieve the foregoing objects and in accordance with its purposes as embodied and broadly described, the present invention provides a vulcanizable elastomer composition comprising a copolymer represented by the formula:

$$H\text{-}[OG\text{-}]_n OH$$

wherein $-[OG-]$ consists of randomly alternating structural units (I) and (II):

$$[-OC_2H_4SC_2H_4-] \quad (I)$$

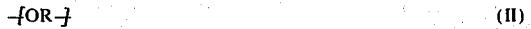

wherein R is one or more radicals which represent the residue remaining on removal of both hydroxyl groups from diols selected from (a) saturated, linear, branched chain, or cyclic diols and (b) linear, branched chain, or cyclic diols containing external unsaturation having an allylic hydrogen atom; the copolymers being characterized in that n is an integer sufficient to provide a molecular weight of at least about 8000; the molar ratio of structural units (I) to structural units (II) being not less than 1:1, and said copolymers containing from about 1 to 10 mole percent of a linear, branched chain, or cyclic diol containing external unsaturation having an allylic hydrogen atom.

Further in accordance with the objects of the invention, it has been found that when the above described vulcanizable elastomeric compositions are cross-linked or vulcanized, the resulting elastomeric products exhibit excellent low temperature flexibility and outstanding resistance to hydrocarbon oils.

Thiodiethanol may be copolymerized with from about 1 to 10 mole percent of a linear, branched chain or cyclic aliphatic diol containing external unsaturation having an allylic hydrogen atom. The resulting vulcanizable elastomeric compositions may range from viscous liquids, which may be mixed with a curing or cross-linking agent, such as benzoyl peroxide or dicumyl peroxide, cast into a suitable mold and cured by heat into an elastomer, to high molecular weight rubbery gums, which can be compounded on conventional rubber compounding equipment with standard sulfur vulcanization recipes and cured or vulcanized by compression molding techniques into highly useful elastomeric products. The latter represents a preferred embodiment of the invention.

Alternatively, one or more saturated, linear branched chain or cyclic aliphatic diols represented by the following formula may be incorporated

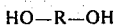

into said copolymers, where R is as previously defined, provided that the ratio of structural units (I) to structural units (II), which includes diols (III), in the copolymer is not less than 1:1, and further provided that from 1 to 10 mole percent of the total of structural units (I) plus (II) are derived from a linear, branched chain or cyclic diol containing external unsaturation having an allylic hydrogen atom. The resulting vulcanizable elastomeric products may range from viscous liquids to rubbery gums, and be cured or vulcanized to useful elastomeric products, as described hereinabove. Those copolymers which are high molecular weight rubbery gums vulcanized by standard sulfur vulcanization recipes represent preferred embodiments of the invention.

Optionally, although not a preferred embodiment of the invention, polythiodiethanol may be copolymerized with the above described diols within the provision described. Any polythiodiethanol of molecular weight higher than thiodiethanol monomer may be used, provided it can be copolymerized with one or more aliphatic diols conveniently with elimination of water; and further provided it conforms to the structural requirements described hereinabove. Alternatively, either thiodiethanol or polythiodiethanol will co-condense with polyols, such as polyoxyalkylene diols, to produce random copolymers within the restrictions described.

Thiodiethanol, because of the positioning of the hydroxyl groups beta to a sulfur atom in a aliphatic chain, exhibits reactivity which is atypical of aliphatic diols. It will undergo autocondensation reactions and co-condensation reactions with typical aliphatic diols to provide high molecular weight polymers within certain limits and under certain conditions. Since in general aliphatic diols will not easily undergo autocondensation reactions or co-condense with other aliphatic diols under the conditions used herein, there is a theoretical limitation for the preparation of high molecular weight polymers of thiodiethanol with aliphatic diols. The theoretical maximum of thiodiethanol structural units (I) in such polymers is 50 mole percent, that is, as mentioned hereinabove, the ratio of structural units (I) to (II) is not less than 1:1, and for practical reasons, preferably greater than 1:1. Attainment of high molecular weight rubbery gums which can be milled and compounded readily on standard rubber processing equipment ordinarily will require a ratio significantly greater than 1:1 and, in fact, it is preferred that copolymers will contain at least about 70 mole percent of thiodiethanol structural units.

Any aliphatic diol which will condense with aliphatic dicarboxylic acids, as for example in the preparation of aliphatic polyesters, will be suitable for the preparation of copolymers in accordance with the present invention. The following list is merely representative of the diols which can be used, and the invention is not limited thereto. They include: ethylene glycol, propane-1,2-diol, propane-1,3-diol, butane-1, 4-diol, pentane-1,5-diol, hexane-1,6-diol, diethylene glycol; cyclohexane di(lower alkylene) diols, such as cyclohexane 1,2-and 1,4-dimethanol, either cis or trans or mixtures thereof, cyclobutane di(lower alkylene) diols, such as cyclobutane -1, 2-dimethanol; aralkylene diols, such as the bis(hydroxyethyl) ether of hydroquinone or resorcinol; the monoallyl ether of trimethylolpropane, the monoallyl ether of glycerol, 3-cyclohexene-1,1-dimethanol; bicyclic aliphatic diols, such as 5-norbornene-2,2-dimethanol,5-norbornene-2,3-dimethanol, and the like.

Preferred saturated diols include diethylene glycol, butane-1,4-diol, bis(hydroxyethyl)ether of hydroquinone. Preferred unsaturated diols include monoallyl ether of trimethylolpropane, monoallyl ether of glycerol and 3-cyclohexene-1, 4-dimethanol.

The expression "external unsaturation" as used herein refers to the position of the unsaturation in the diol molecule such that at least one continuous chain of atoms remains in the diol, extending between the two diol oxygen atoms, which chain does not include any carbon-to-carbon double bonds. The unsaturated diols enumerated above as preferred unsaturated diols are examples of diols containing external unsaturation having an allylic hydrogen atom.

The novel polymers of the invention are prepared under dehydrating conditions using an acidic catalyst. Acids having a pK of 5 or less are useful. Certain acid catalysts, although useful, tend to produce undesirable side reactions leading to the formation of odoriferous thioxane and/or dithiane, and are therefore less desirably used. Suitable catalysts include hydrogen chloride and sulfuric acid, p-toluene sulfonic acid, sulfamic acid, picric acid, phosphorous acid, trialkyl phosphites, and the like. Phosphorous acid is a preferred acid catalyst. Effective catalysis is achieved using from 0.01 to 3 percent by weight of monomers, preferably 0.1 to 1 percent. More than about 3 percent may be used, but no advantageous result is obtained thereby.

The mill handling characteristics of an elastomer can be evaluated by the so-called Mooney value (ML-4). The Mooney value of natural rubber, e.g., is high, due to naturally occurring crosslinks. Natural rubber, with a Mooney value of about 60, must be broken down on the rubber mill before conventional compounding ingredients can be incorporated. Most synthetic elastomers have Mooney values in the range of about 20–50, but elastomers having Mooney values of 5 or 10 can be handled on a rubber mill. The elastomers of the present invention in its preferred embodiment have Mooney values in the conventional range of about 10–50, as measured by ASTM No. D1646. The Mooney value of the polymer compositions of the present invention may be increased by the incorporation of small amounts of crosslinking, without departing from the scope of the invention. Such crosslinking is optional, and may be obtained by incorporating minor amounts of an aliphatic triol in the polymer composition, for example, such as trimethylolpropane.

The polymers have excellent low temperature flexibility as measured by thermomechanical analysis using a duPont Thermomechanical Analyzer, Model 990, Module 942. The method basically measures the first transition temperature of a specimen which is warmed from −120°C. in contact with a weighted, needle-like probe. The transition temperature is determined from the first deflection point on a continuously recorded chart. This first transition temperature is analogous to the glass transition temperature (Tg) and is referred to herein as brittle point.

Similarly, the polymers have outstanding resistance to hydrocarbon oils, as evidenced by low volume swell in contact with the oils. This is measured by ASTM No. D471.

The elastomers of the invention can be cured into useful elastomeric products by casting or by conventional compounding and vulcanization using standard rubber compounding techniques. Thus, in certain instances where the polymers are viscous liquids they may be mixed with a cross-linking agent, such as benzoyl peroxide or dicumyl peroxide, poured into a suitable mold and cured by heating at an appropriate temperature. Alternatively, the higher molecular weight gums may be compounded on standard rubber processing equipment with conventional compounding ingredients, such as carbon black or other pigments and fillers, vulcanizing agents such as accelerators and sulfur, promotors such as zinc oxide, lubricants and mold release agents, antioxidants, plasticizers and the like, and compression molded into useful elastomeric products.

The following examples are provided for illustrative purposes and may include particular features of the invention. However, the examples should not be construed as limiting the invention, many variations of which are possible without departing from the spirit or scope thereof.

EXAMPLE 1

COPOLYMER OF THIODIETHANOL AND TRIMETHYLOLPROPANE MONOALLYL ETHER

A mixture of 1480 parts, 12.15 moles, of thiodiethanol and 120 parts, 0.7 mole, of the monoallyl ether of trimethylolpropane was heated to 60°C. under a nitrogen atmosphere. When the temperature reached 60°C., 16 parts phosphorous acid (1% by weight of monomers) was added and the reaction mixture then heated to 200°C., while distilling water formed during the condensation reaction. After about 1 hour the temperature was reduced to about 180°C. and a vacuum applied for about 1 hour. The reaction mixture was then cooled.

An Atlantic 2CV Reactor (1) was charged with 300 parts of the low molecular weight, viscous reaction product obtained in the above manner and the reaction continued at 180°C. for about 15 hours under a vacuum. A tough rubbery gum was obtained.

The gum obtained, 100 parts, was compounded on a standard 2-roll rubber mill as follows:

1. A high shear sigma-mixer manufactured by Atlantic Research Co., Gainesville, Va.

| COMPOUNDING RECIPE | Parts by Weight |
|---|---|
| Gum | 100 |
| Hydrated lime | 4 |
| Stearic acid | 2 |
| Carbon black | 40 |
| Hydrated sodium silico aluminate | 2 |
| 2-Mercaptobenzothiazole | 1.5 |
| Tetramethylthiuram disulfide | 1.5 |
| Sulfur | 1.5 |
| Zinc Oxide | 5.0 |

The compounded mixture was then compression molded into a 6 inch × 6 inch × 0.125 inch test sheet at 290°F. for 18 minutes. Physical properties were:

| | |
|---|---|
| Brittle Point, °C. (2) | −60 |
| Elongation, % | 220 |
| Modulus at 100%, psi | 700 |
| at 200%, psi | 1250 |
| Tensile, psi | 1350 |
| Hardness, Shore A | 72 |
| Break set, % | 0 |
| Volume swell, % (ASTM No. 3 oil) | 8 |

(2) Using Thermomechanical Analyzer, duPont (see above).

The data illustrate the excellent low temperature flexibility and resistance to swelling in hydrocarbon oils.

EXAMPLES II – VII

Following the procedure of Example 1, several polymer compositions were prepared, as described below. Percentages shown are percentages by weight.

| Ex. | POLYMER COMPOSITIONS |
|---|---|
| II | Thiodiethanol (97.5%) - trimethylolpropane monoallyl ether (2.5%); ML-4 at 212°F = 14 |
| III | Thiodiethanol (95%) - trimethylolpropane monoallylether (5%); ML-4 at 210°F — 34 |
| IV | Thiodiethanol (92.5%) - trimethylolpropane monoallylether (7.5%) |
| V | Thiodiethanol (85%) - diethyleneglycol (10%) - trimethylolpropane monoallyl ether (5%) |
| VI | Thiodiethanol (82.5%) - dihydroxyethyl ether of hydroquinone (10%) - trimethylolpropane, monoallylether (7.5%) |
| VII | Thiodiethanol (95%) - 3-cyclohxene-1,1-dimethanol (5%) |

The polymer compositions were compounded as described in Example I and physical properties measured. Data are shown in the Table following.

TABLE 1

| | EXAMPLES | | | | | |
|---|---|---|---|---|---|---|
| | II | III | IV | V | VI | VII |
| Brittle Pt., °C. (1) | — | — | −63 | −61 | −56 | −62 |
| Elongation, % | 275 | 240 | 270 | 130 | 210 | 175 |
| Modulus, psi at 100% | 435 | 510 | 500 | 825 | 600 | 510 |
| at 200% | 765 | 930 | — | — | — | — |
| Tensile, psi | — | 1000 | 1175 | 1000 | 1200 | 720 |
| Hardness, Shore A | 67 | 67 | 65 | 77 | 65 | 68 |
| Volume Swell, % | 2.0 | 3.0 | — | — | — | — |

(1) See note (2), Ex. 1

EXAMPLES VIII – X

Following the procedure of Example I the following compositions were prepared:

| Example | Polymer Compositions |
|---|---|
| VIII | Thiodiethanol (93%) - trimethylolpropane, monoallylether (7%) |
| IX | Thiodiethanol (88%) - trimethylolpropane, monoallylether (7%) - p-xylene-α,α'-diol (5%) |
| X | Thiodiethanol (83%) - butane-1,4-diol (10%) - trimethylolpropane, monoallylether (7%) |

Compositions of Examples IX and X gave Mooney values (ML-4) of 32 and 13.5, respectively. The compositions were compounded on a standard rubber mill using the following formulation (parts by weight):

| FORMULATION | |
|---|---|
| Gum | 100 |
| Hydrated lime | 1 |
| Stearic acid | 1 |
| Carbon black | 40 |
| 2-Mercaptobenzothiazole | 1.5 |
| Tetramethylthiuram disulfide | 1.5 |
| Sulfur | 0.8 |
| Zinc Oxide | 5.0 |

The compounded mixtures were then compression molded into 6 inch × 6 inch × 0.125 inch test sheets. Physical properties were measured on an Instron Tester. Data are given below.

TABLE 2

| Ex. | VIII | IX | X |
|---|---|---|---|
| Elongation % | 190 | 170 | 175 |
| Modulus, psi at 50% | 400 | 330 | 215 |
| at 100% | 700 | 700 | 600 |
| Tensile, psi | 1250 | 1275 | 1185 |
| Hardness, Shore A | 69 | 68 | 68 |
| Break set, % | — | 5 | 7 |
| Cure, °F/minutes | 300/20 | 300/10 | 300/10 |

What is claimed:

1. A vulcanizable elastomer composition comprising a copolymer represented by the formula:

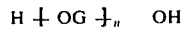

wherein $-\!\!+\!\!$ OG $+\!\!-$ consists of randomly alternating structural units (I) and (II)

   (I)

   (II)

wherein R is one or more radicals which are the residues remaining on removal of two aliphatic hydroxyl groups of diols selected from (a) saturated linear, branched chain or cyclic diols and (b) linear, branched chain or cyclic diols containing external unsaturation having an allylic hydrogen atom; being characterized in that n is an integer sufficient to provide a molecular weight at least about 8000; the molar ratio of structural units (I) to structural units (II) being not less than 1:1; and containing from about 1 to 10 mole percent of the total of (I) and (II) of said linear, branched chain or cyclic diol containing external unsaturation.

2. A composition according to claim 1 wherein the ratio of structural units (I) to structural units (II) is greater than 2:1.

3. A composition according to claim 1 wherein structural units (II) are derived from linear, branched chain or cyclic diols containing external unsaturation having an allylic hydrogen atom.

4. A composition according to claim 3 wherein structural units (II) comprise from 1 to 10 mole percent of the total of structural units (I) and (II).

5. A composition according to claim 1 wherein said saturated diol is selected from 1,4-butanediol, diethylene glycol and bis(hydroxyethyl)ether of hydroquinone and said unsaturated diol is selected from monoallylether of trimethylolpropane, monoallylether of glycerol and 3-cyclohexene-1,1-dimethanol.

6. The elastomeric products obtained by sulfur vulcanization of the composition of claim 1.

7. A method for preparing the composition of claim 1 which comprises condensing thiodiethanol with one or more aliphatic diols, selected from (a) saturated, linear, branched chain or cyclic diols and (b) linear, branched chain or cyclic diols containing external unsaturation having an allylic hydrogen atom, at a temperature sufficient to remove water formed during said condensation, in the presence of from about 0.1 to 3 weight percent, based on the weight of thiodiethanol and diols, of an acid having a pK of 5 or less; provided that the ratio of structural units (I), derived from thiodiethanol to structural units (II), derived from one or more of said aliphatic diols, is not less than 1:1, and further provided that from about 1 to 10 mole percent of the total of said structural units (I) and (II) derived from a linear, branched chain or cyclic diol containing external unsaturation having an allylic hydrogen atom.

8. A method according to claim 7 wherein said acid is phosphorous acid.

* * * * *